May 7, 1935.  T. R. WINCHELL  2,000,544
BARREL
Filed Oct. 27, 1933  4 Sheets-Sheet 1
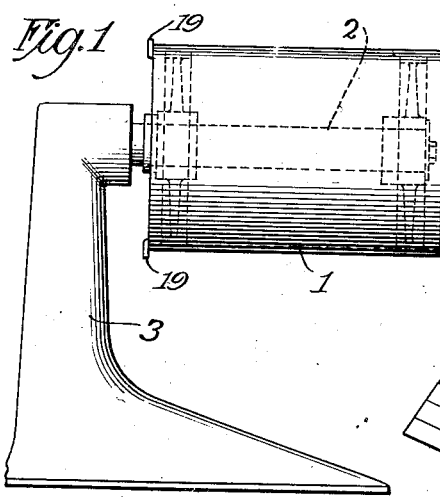
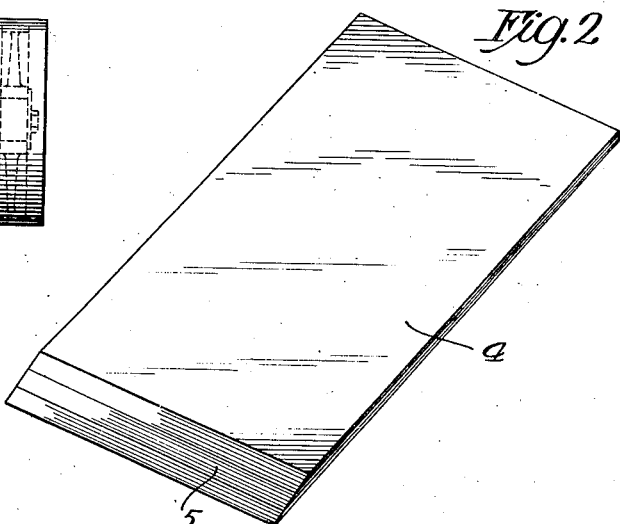
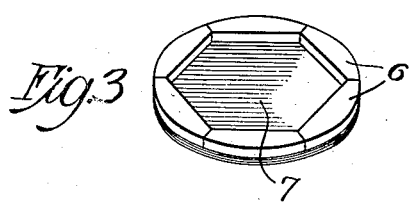
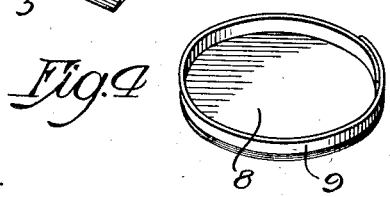
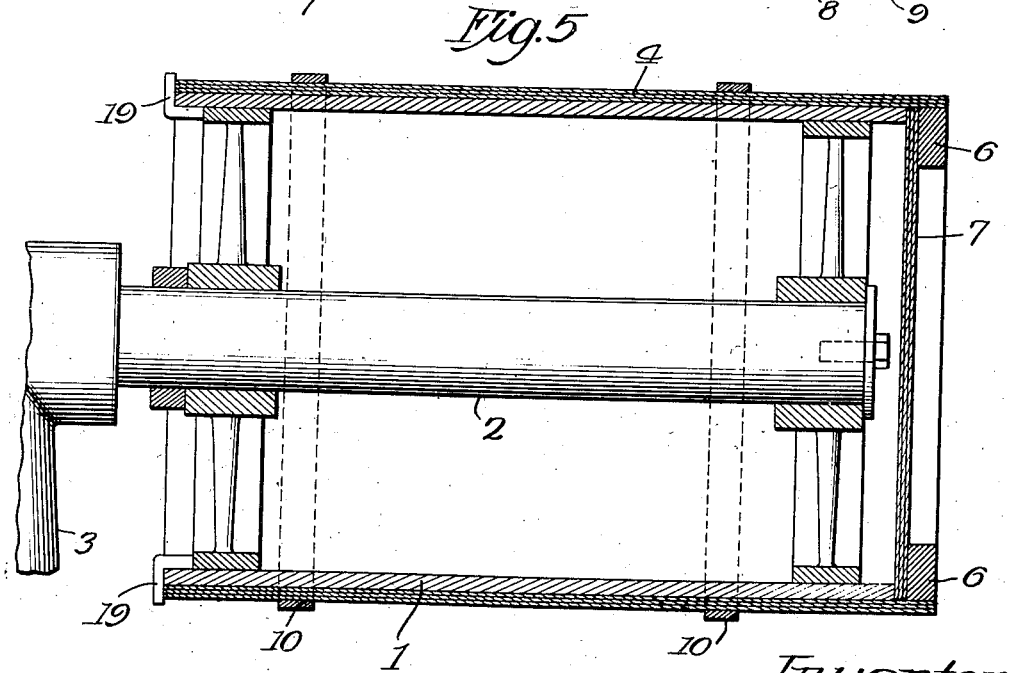
Inventor
Thomas R. Winchell
By Arthur F. Durand
Atty.

May 7, 1935.  T. R. WINCHELL  2,000,544
BARREL
Filed Oct. 27, 1933    4 Sheets-Sheet 2
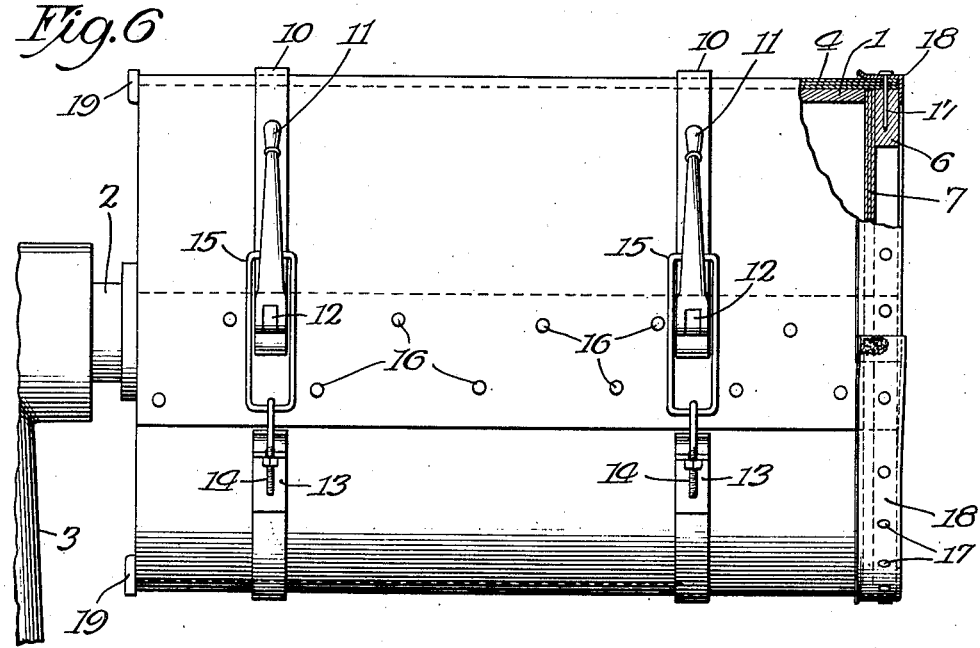
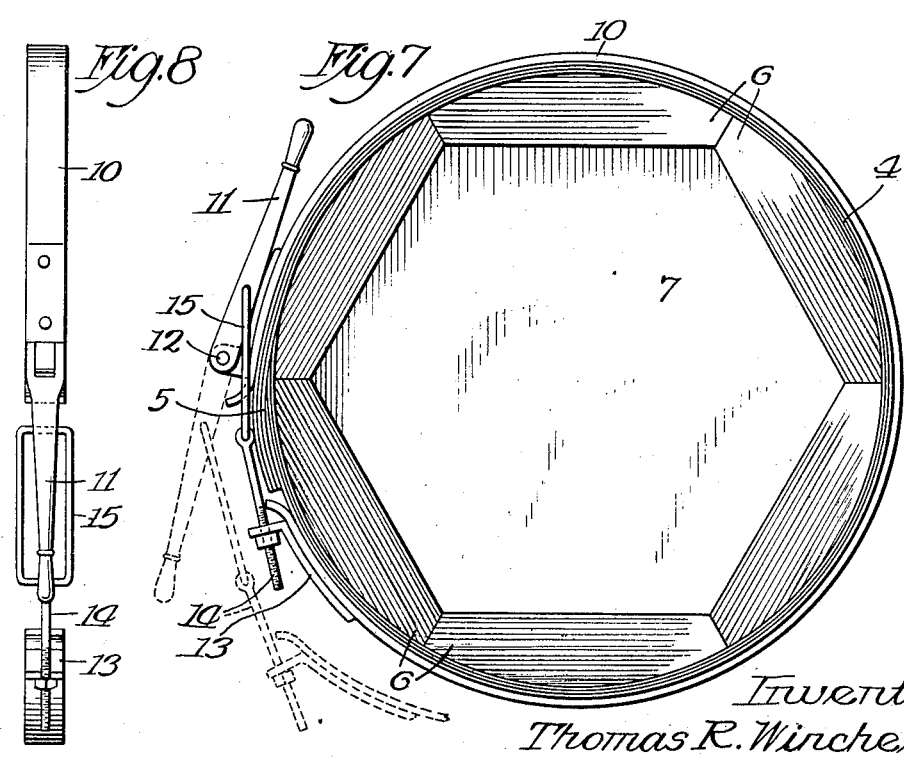
Inventor
Thomas R. Winchell
By Arthur F. Durand
Atty.

May 7, 1935. T. R. WINCHELL 2,000,544
BARREL
Filed Oct. 27, 1933 4 Sheets-Sheet 3

Inventor:
Thomas R. Winchell
By Arthur F. Durand
Atty.

May 7, 1935.  T. R. WINCHELL  2,000,544
BARREL
Filed Oct. 27, 1933   4 Sheets-Sheet 4

Inventor
Thomas R. Winchell
By Arthur F. Durand
Atty.

Patented May 7, 1935

2,000,544

UNITED STATES PATENT OFFICE 2,000,544

BARREL

Thomas R. Winchell, West Newton, Mass., assignor to Northern Maine Plywood Company, Portland, Maine, a corporation of Maine Application October 27, 1933, Serial No. 695,428

9 Claims. (Cl. 147—1)

This invention relates to the manufacture of plywood barrels, preferably barrels that are cylindrical, although they may taper slightly.

Generally stated, the object of the invention is to provide a novel and improved process or method and apparatus of making barrels of this kind, whereby they can be effectively and economically made by hand, if desired, in order to fulfill the requirements of those who cannot afford to buy expensive machinery, and whereby the steps of making a barrel of this kind are novel in the order in which they are performed.

It is also an object to provide certain details and features tending to increase the general efficiency and desirability of a process or method and an apparatus of this particular character.

To the foregoing and other useful ends, the invention consists in matters hereinafter set forth, and claimed and shown in the accompanying drawings, in which—

Fig. 1 is a side elevation of an apparatus for assembling the materials and practicing the new process or method.

Fig. 2 is a perspective showing a sheet of plywood of the kind from which the barrels are made.

Fig. 3 shows one form of preformed barrel head.

Fig. 4 shows another form of preformed barrel head.

Fig. 5 is a longitudinal section of the drum upon which the materials are assembled, showing the cylinder plywood and one of the barrel heads held in place thereon.

Fig. 6 is a side elevation of the structure shown in Fig. 5, with one portion thereof shown in section.

Fig. 7 is an end elevation of the structure shown in Fig. 6 of the drawings.

Fig. 8 is a side elevation or edge view of one of the annular clamps shown in Fig. 6 for clamping the cylinder of plywood upon the drum upon which the materials are assembled and fastened together.

Figure 9:
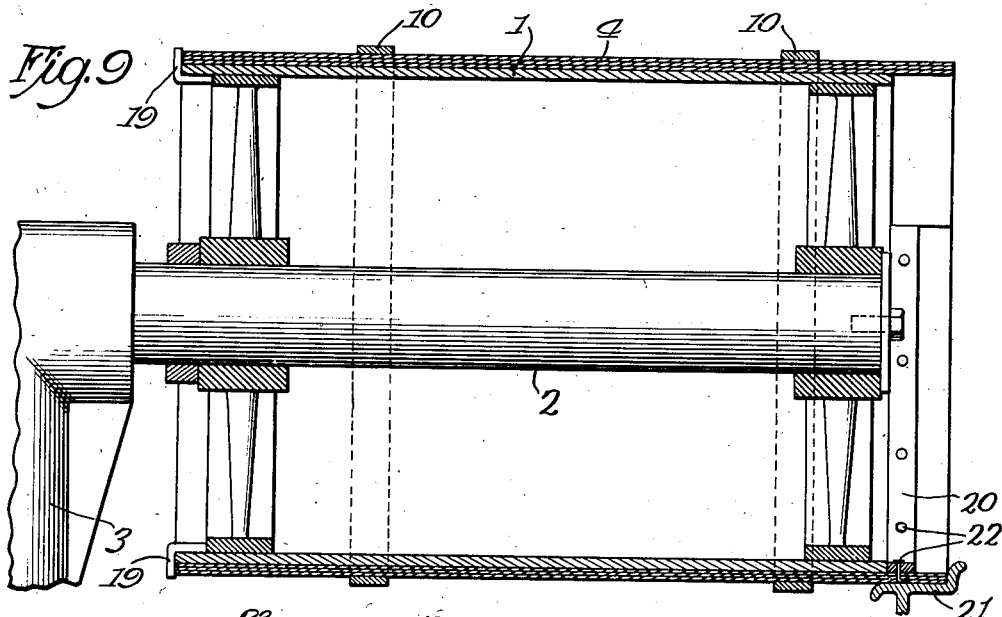
Fig. 9 is a view similar to Fig. 5, showing a different form of the invention.

As thus illustrated, the apparatus for practicing the improved method, embodying the principles of the invention, comprises a cylindrical drum 1, mounted on a horizontal axle or spindle 2, the latter being fixed at one end in the upper portion of the pedestal 3, whereby the outer end of the drum is freely accessible.

In practicing the method or process, the first step consists in cutting a plywood sheet 4, as shown in Fig. 2 of the drawings, with one end edge scarfed off at 5, on the inner side of the sheet, as shown. This sheet of plywood preferably consists of three layers, with the grain of the wood of the inner and outer layers extending longitudinally of the barrel, and with the grain of the wood of the intermediate layer extending circumferentially of the barrel.

Second, barrel heads are made, such as those shown in Figs. 3 and 4 of the drawings, of any suitable or desired character. The one shown in Fig. 3 is constructed by using blocks or cleats 6, fastened end to end around the periphery of the barrel head, the wall 7 of this head consisting of a disk of plywood. In Fig. 4, the disk of plywood 8 is fastened to the edge of a hoop 9, and the overlapping ends of the hoop are suitably fastened together. In this way, the method starts with preformed sheets of plywood for the body of the barrel, and with preformed barrel heads for closing the ends of the barrel.

Third, the plywood sheet 4 is wound around the drum 1, in the manner shown in the drawings, with the end portions of the sheet overlapping to form a lap joint or seam extending longitudinally at one side of the barrel.

Fourth, the clamps 10, shown in the drawings, are placed around the plywood cylinder thus formed, and the clamps are more or less tightened to hold the plywood cylinder firmly in place on the drum. For this purpose, each steel band clamp 10 has a handle or lever 11 pivoted on one end of the band, at 12, and has a bracket 13 having an adjustable eye-bolt 14 on the other end of the band. A link 15 connects the lever 11 with the eye-bolt 14, thus forming a sort of toggle, whereby when the handle is in the position shown in full lines in Fig. 7 of the drawings, the clamp is tight on the plywood cylinder. But when it is desired to remove the barrel, the handle is swung into the position shown in dotted lines in Fig. 7 of the drawings.

Fifth, the bottom head of the barrel is placed in position, within the outer end of the plywood cylinder, as shown in Figs. 5 and 7 of the drawings, the head in this case being assumed to be the head shown in Fig. 3 of the drawings.

Sixth, the clamps 10 are then fully tightened, to draw the plywood tightly and firmly upon the cylindrical surface of the rotary drum, and to draw the plywood cylinder tightly about the bottom head of the barrel, said head having been placed in position as explained.

Seventh, the fastening devices 16 are then inserted through the overlapping portions of the barrel body, to permanently fasten the lap joint or seam together. For this purpose, either nails or staples may be employed, and in either case they are preferably clinched on the inner surface of the barrel body, flush with said surface, so that while the nails or staples will not pull out, they will not at the same time make the inner surface of the barrel rough. Staples are preferable, inasmuch as they are not as easily pulled out as nails, but in a hand method of this kind, it may be easier to employ nails.

Eighth, it is preferable to now remove the clamps from the cylindrical barrel thus formed, preliminary to the rest of the work.

Ninth, nails 17 are then inserted radially, through the side walls of the barrel, close to the annular end edge thereof, into the cleats 6 of the preformed head of the barrel.

Tenth, if outside hoops are to be employed, they can be put on in different ways. If outside wood hoops are to be employed, they can be wound on and secured in place when the drum is rotated for the nailing of the preformed head in place. If a metal hoop 18 is employed, for each end of the barrel, the bottom hoop of this kind can be placed on the end of the barrel at the same time that the head is put in place, and can be fastened in place by the nails 17 in the manner shown. Obviously, staples can be used in place of the nails 17, if such is desirable and if circumstances permit. All this is done when the open end of the barrel is against the stops 19 or other means for positioning the barrel on the drum.

Eleventh, the finished barrel can now be removed endwise from the rotary drum 1 upon which it was made, away from the stops 19 for engaging the top end edge of the barrel, as previously described, to correctly position the plywood cylinder on the drum. In addition, the drum is of such length that when the bottom head is inserted in place, it bears against the outer annular end edge of the drum, so that this edge serves as a stop or liner to properly position the preformed head in the end of the barrel.

Twelfth, if desired, an ordinary inside hoop or liner 20 can be provided for either one or both ends of the barrel, to limit the insertion of the heads in the barrel, and the liner or liners can be incorporated in the structure of the barrel at any suitable point in the process or method of assembling and fastening the materials together. Ordinarily, a liner of this kind is only necessary for the upper end of the barrel, obviously, being of assistance in the positioning and fastening of the top head of the barrel in place.

Figure 10:
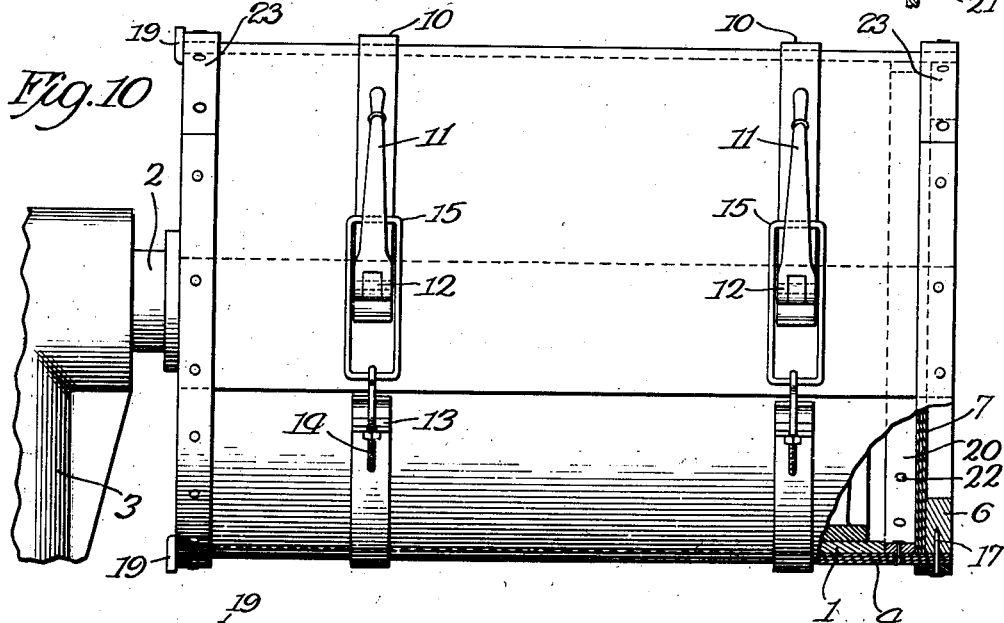
Fig. 10 is a view similar to Fig. 6, showing the form of the invention illustrated in Fig. 9 of the drawings.
Figure 11:
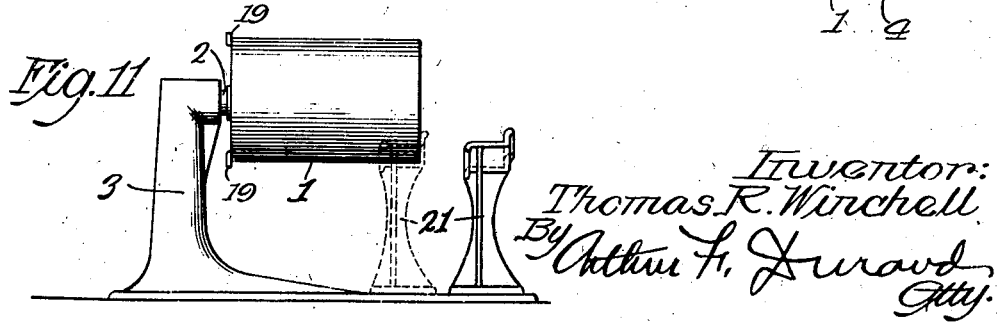
Fig. 11 is a view similar to Fig. 1, showing the apparatus adapted for use in practicing that form of the invention shown in Figs. 9 and 10 of the drawings.
Figure 12:
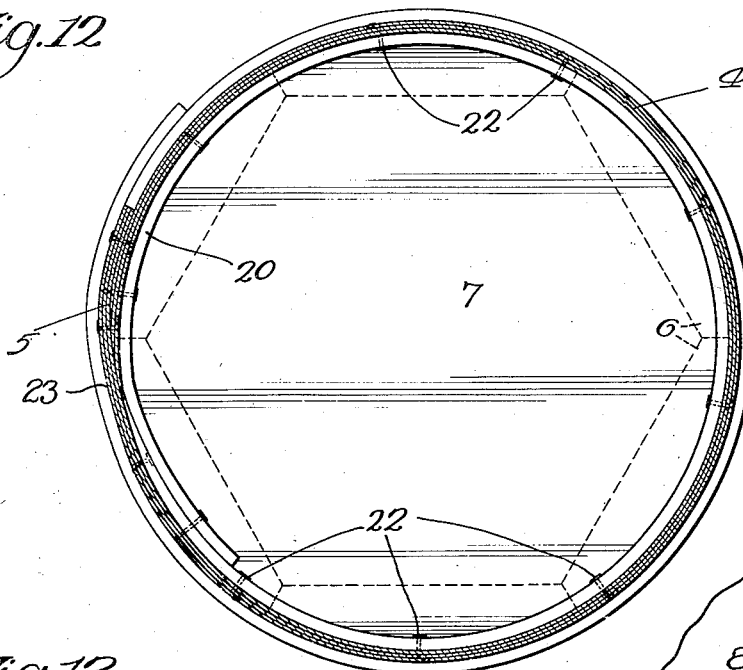
Fig. 12 is a transverse section of one of the barrels, showing the form of the invention employed in Figs. 9 and 10 of the drawings.
Figure 14:
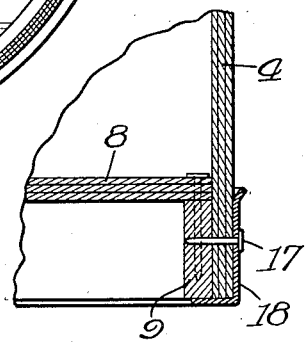
Fig. 14 is an enlarged detail sectional view of a portion of the barrel shown in Figs. 5 and 6 of the drawings.
Figure 13:
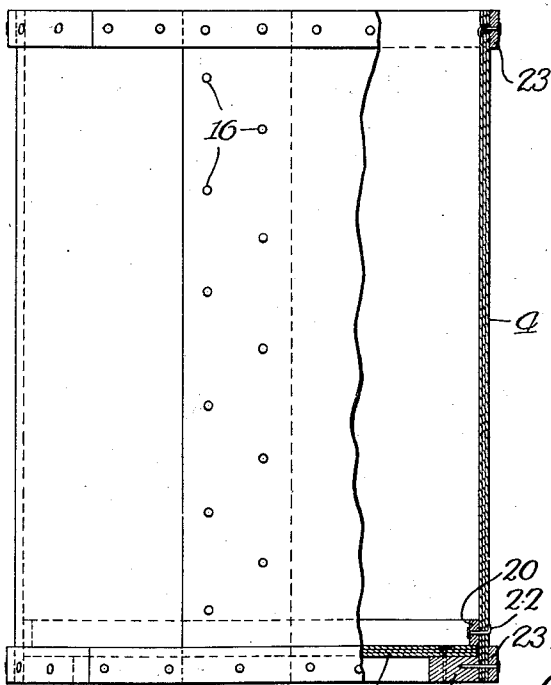
Fig. 13 is a side elevation of the barrel shown in Fig. 12, with one side thereof in longitudinal section.
Figure 15:
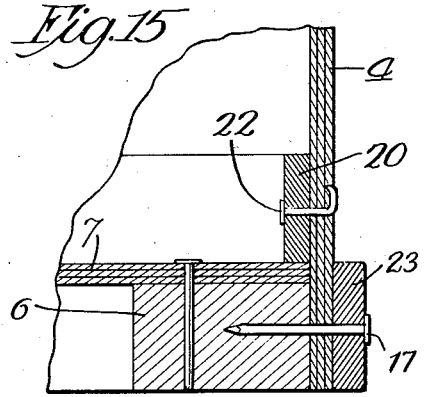
Fig. 15 is a similar fragmentary sectional view of a portion of the barrel shown in Figs. 9 and 10 of the drawings.

Thirteenth, as shown in Figs. 9, 10 and 11 of the drawings, a rest or support 21 is of assistance in the step of fastening the bottom head of the barrel in place. Normally, this rest or support occupies the position shown in full lines in Fig. 11 of the drawings, but when the point is reached when the barrel must be rotated to fasten the bottom head in place, this support 21 is then moved into the position shown in dotted lines in this figure of the drawings. In this position, the upper end of the support 21 engages the lower side of the barrel, at its end, as shown more clearly in Fig. 9 of the drawings, and in this way the end of the barrel is supported against downward hammer blows on the under side of the barrel when the nails are driven to fasten the barrel head in place. This support 21 is shaped to permit easy rotation of the end of the barrel thereon when it is desired to drive the nails to fasten the bottom head in place.

The above are the various steps, preferably, but not necessarily, in the order in which they are recited, for the making of a barrel of this kind by hand. It will be observed that the cylindrical drum is removable from the axle or spindle upon which it is rotatably mounted, and in this way drums of different diameters can be used interchangeably with each other in connection with the barrel setting up machine. By this method or process, plywood barrels can be made without the use of expensive equipment, and while made by hand, they will nevertheless be of good quality. An apparatus and a method of this kind can be employed in small shops where expensive barrel making machinery, more or less automatic, could not be afforded.

It will be understood that the successive steps may vary somewhat, in character, depending upon the materials employed and other circumstances. For example, it may be found sufficient to merely leave the bottom clamp, the clamp nearest the bottom end of the barrel, loose, before putting the barrel head in place, and to simply tighten this one clamp after the head is in position. Also, it may be found desirable to insert the liner 20, as shown in Figs. 9 and 10 of the drawings, against the end of the drum, and to fasten this liner in place by nails 22, driven outwardly through the liner and through the side walls of the barrel, clinching these nails on the support 21 previously mentioned.

Also, in order to obviate the use of inside hoops or liners, it is obvious that the preformed barrel heads can be formed in a manner to limit their insertion in the ends of the barrel, thus making inside hoops or liners for this purpose unnecessary. There are various ways of making heads, for that purpose, and it is not necessary to illustrate any specific formation for this purpose.

There are various details, of course, which can be changed or varied without departing from the spirit of the invention. For example, the cylindrical drum may be made collapsible, as by splitting one side thereof, so that it can be contracted slightly, if such is necessary or desirable in order to move the finished barrel. Also, in place of the stops 19, suitable or ordinary adjustable means (not shown) may be employed to engage the end of the barrel, for barrels of different heights. Again, other devices, in place of those shown and described, may be employed for readily clamping the plywood sheet upon the rotary drum, and the invention, in its broader aspects, is not limited to the particular clamp shown and described. Moreover, it is obvious that other means may be employed to facilitate the insertion of the liner 20 in the barrel, and the proper positioning thereof, after the plywood is clamped around the cylinder or drum, and the invention is not limited to the liner positioning means shown and described. After the plywood is clamped around the cylinder, the liner may be inserted, and then the preformed head, and tacks or staples may then be driven through the plywood and liner and clinched on any suitable means, either before or after the outside bottom hoop and preformed bottom are nailed in place.

Thus it will be seen that in the practice of the method constituting the invention, a sheet of plywood or other material is wound around a drum, and temporarily held in such condition by clamping means, of any suitable character, suitably adjusted to permit the insertion of the preformed barrel head, with such adjustment of the clamping means after the barrel head is in position as will put the lap-joint or seam of the plywood in condition for receiving metal fasteners, while the drum is held against rotation, whereby this seam is permanently fastened before the preformed barrel head is fastened in place at the bottom end of the barrel, and before the wood hoops 23 are fastened in place, if wood hoops are desired. If it is desired to employ a metal hoop, such as those shown in the drawings, around the bottom end of the barrel, it may be put in place as explained, after the clamping means are removed, and after the side seam is fastened, so that this hoop and the preformed barrel head may be fastened in place by the same nails or other fasteners as shown in Fig. 6 of the drawings.

While solid plywood is shown and described as the material for the barrel body, and for the disk of the barrel head, it is understood that the method and apparatus shown can be employed in connection with other sheet material, for the production of similar barrels by this same method.

What I claim as my invention is:

1. Apparatus for making barrels by hand, comprising a rotary annular drum of less length than the barrel and whereon to wind a sheet of plywood into annular barrel form, with the projecting end of the barrel body open and unobscured, means on the drum to engage the top end of the barrel to position the bottom end thereof a distance beyond the end of the drum, said drum thus being adapted to permit insertion of a preformed head in the said open bottom end of the barrel, after said sheet is rolled on the drum, encircling clamps for holding the plywood in overlapping relation on the drum, adapted to be tightened thereon, whereby the said lap joint may then be permanently fastened together, said clamps being removable to permit fastening of the barrel head in the bottom end of the barrel and a support for the bottom end of the barrel, in the plane of said head, whereon the barrel is rotated during the operation of fastening the barrel head in place, said support being adjustable into and out of operative position, and being formed to engage the end edge of the barrel, thereby holding the latter against axial displacement.

2. A method for making a barrel by hand, comprising the winding of a sheet of material into annular barrel form, placing clamps loosely around the rolled sheet, placing a preformed bottom head in position in one end of the barrel body thus formed, tightening one or more clamps to cause the barrel body to grip the preformed barrel head, fastening the lap joint or seam formed by the overlapping portions of the sheet, removing one or more of the clamps, and fastening the preformed barrel head in place.

3. A method as specified in claim 2, comprising the rotation of the barrel after suitable adjustment of the clamps and during the fastening of the preformed barrel head in place, after the fastening of said lap-joint or seam while the barrel is held against rotation, and during such rotation winding and fastening one or more outside hoops around the barrel, all while the barrel remains in the same position in which the sheet was first wound as stated.

4. A method as specified in claim 2, comprising the placing of an outside hoop around the bottom end of the barrel, after removal of the clamps, and fastening said hoop to the barrel at the same time that the head is secured in place, all while the barrel remains in the same position in which the sheet was first wound as stated.

5. A method for making a barrel by hand, comprising the winding of a sheet of material into annular barrel form, placing clamping means around the rolled sheet, suitably adjusted to permit the insertion of a preformed barrel head in the bottom end of the barrel, suitably adjusting the clamping means to cause the barrel body to grip the preformed barrel head, so that the latter will be supported entirely by the bottom end of the body, fastening the lap-joint or seam formed by the over-lapping portions of the sheet, and thereafter fastening the preformed barrel head in place.

6. A method for making a barrel, comprising the rolling of a sheet of material into annular form, with the edges of the sheet overlapping at one side of the barrel, placing a preformed barrel head in the bottom end of the barrel body thus formed by the plywood sheet, tightening the sheet around the preformed barrel head, permanently fastening the seam or overlap formed by the overlapping portions of the material, and thereafter fastening the barrel head in place.

7. A method as specified in claim 6, comprising the placing of a preformed hoop around the end of the barrel, before the barrel head is fastened in place, and securing this hoop in place by the same operation that fastens the barrel head in the end of the barrel.

8. A method as specified in claim 6, comprising the coiling and fastening of hoops around the ends of the barrel, while the barrel is being rotated to facilitate the fastening of the barrel head in place, all while the barrel remains in the same position where the sheet was first rolled as stated.

9. A method as specified in claim 6, comprising the placing and fastening of a hoop-shaped liner within the barrel, after the lapping of the ends of the sheet, and before the head is in place.

THOMAS R. WINCHELL.